United States Patent [19]

Ulrich et al.

[11] Patent Number: 4,558,950
[45] Date of Patent: Dec. 17, 1985

[54] INTERFEROMETRIC DISTANCE AND DIRECTION MEASUREMENT

[75] Inventors: Reinhard Ulrich, Buchholz; Klaus Jansen, Hamburg, both of Fed. Rep. of Germany

[73] Assignee: H. Maihak AG, Fed. Rep. of Germany

[21] Appl. No.: 517,676

[22] Filed: Jul. 27, 1983

[30] Foreign Application Priority Data

Jul. 28, 1982 [EP] European Pat. Off. ....... 82.106843.4

[51] Int. Cl.$^4$ ............................................. G01B 9/02
[52] U.S. Cl. ................................... 356/345; 356/351; 356/352
[58] Field of Search ......................... 356/345, 351, 352

[56] References Cited

U.S. PATENT DOCUMENTS 3,282,148 11/1966 Yamada ................................ 356/352
3,373,651 3/1968 Mack et al. ......................... 356/352
4,153,370 5/1979 Corey, III ........................... 356/358
4,444,501 4/1984 Schwiesow ..................... 356/352 X

FOREIGN PATENT DOCUMENTS 2926738 1/1981 Fed. Rep. of Germany .
3044183 6/1982 Fed. Rep. of Germany .
7638917 7/1978 France .

OTHER PUBLICATIONS

W. R. C. Rowley, Interferometric Measurement of Length and Distance, Nov. 1972, pp. 887–896, Alta Frequenza, vol. XLI, No. 11.

Primary Examiner—Davis L. Willis
Assistant Examiner—Matthew W. Koren
Attorney, Agent, or Firm—Roylance, Abrams, Berdo & Goodman

[57] ABSTRACT

For interferometric measurement of the length of the linear component of movement of a moving point relative to a fixed point and simultaneous recognition of the direction of that movement, two merged or overlapping Fabry-Perot part interferometers are used to form an asymmetric pattern of the reflection or transmission intensity which is periodically dependent on the linear component of the path, the pattern having main and secondary maxima of different heights and main and secondary minima of different depths. The intensity variation is converted by a detector into electrical intensity signals which cross threshold values of trigger circuits to produce output pulses. The pulses are combined and counted to produce displays of the direction and to provide a reading of the instantaneous position of the movable point.

23 Claims, 12 Drawing Figures

Fig. 4(b) FORWARD

Fig. 4(c) BACKWARD

INTERFEROMETRIC DISTANCE AND DIRECTION MEASUREMENT

This invention relates to a method and apparatus for interferometrically measuring the length of a linear component of movement and for the concurrent recognition of the direction of movement.

BACKGROUND OF THE INVENTION

The measurement of a distance or displacement is fundamental to various forms of transducers for measuring numerous mechanical variables such as force and weight, pressure or acceleration, because such variables can easily be converted to proportional displacements by calibrated springs, membranes or masses. This also applies to other variables such as thermal, electric and magnetic variables. In view of the trend toward rapidly increasing automation, the measurement of displacement thus becomes a basic problem in measuring techniques.

Important considerations in this connection are reliability and the freedom from interference of both the measurement itself and also of the transmission of the measured values to an indicating unit or evaluation computer. This problem exists particularly in power supply and industrial process sytems which often provide an electromagnetically disturbed environment, such as in the vicinity of pulse-controlled electric drives, high frequency furnaces and high voltage installations. For these and other uses such as, for example, in spaces which involve a danger of explosion, a purely optical distance measuring system and an optical signal transfer associated with the system by means of light conductive fibers appears to be highly advantageous because of the very great frequency separation between the frequencies of the disturbing electrical fields and the optical range of the electromagnetic spectrum, causing the disturbing effect to be practically negligible.

Figure 1:
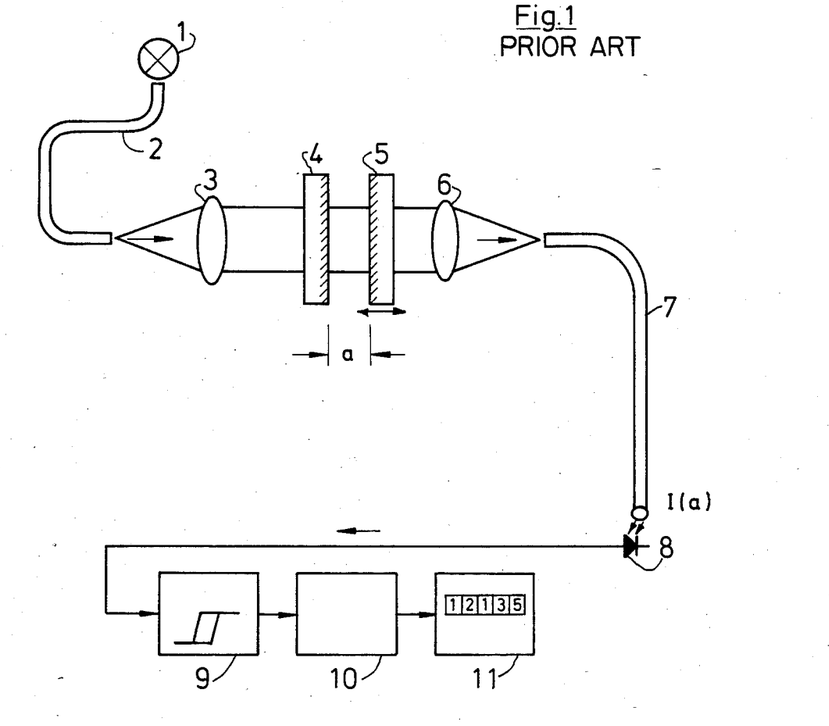
FIG. 1 is a simplified schematic illustration of a distance measuring interferometer employing an optical arrangement in accordance with the prior art.

Various fiber optic displacement transducers have been described in the literature including the following articles: N. Lagakos et al, "Applied Optics", Vol. 20, pp. 167-168 (1981); W. B. Spillman and D. H. McMahon, "Appl. Phgys. Lett.", Vol. 37, pp. 145-147 (1980). An optical displacement transducer in the configuration of a Fabry-Perot interferometer appears to be particularly advantageous for digital electronic evaluation, and can be provided with optical fibers for transmitting the signal (Born and Wolf, "Principles of Optics", Pergamon Press, 3d Ed., page 323 et seq. (1965)). A schematic diagram of such a device is shown in FIG. 1 in which the transmission of the light between the two reflectors 4 and 5 as a function of distance "a" between the reflectors is used for the interferometric measurement. Monochromatic light from a light source 1 is supplied through a light conductor 2 and a lens 3 to the reflectors 4, 5. One of the reflectors 4 is fixedly mounted and the other reflector 5 is movable as indicated by the double-headed arrow in such a way that its reflective surface remains parallel with that of reflector 4, the varying distance between and perpendicular to the surfaces 4 and 5 being the component to be measured.

Figure 2:
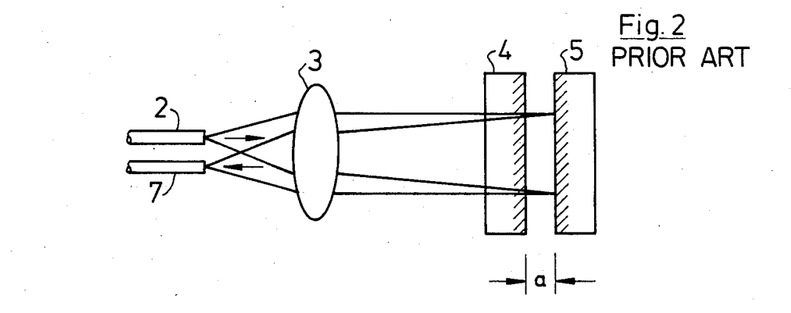
FIG. 2 is a simplified schematic diagram of a different optical arrangement usable in the system of FIG. 1.
Figure 3A:
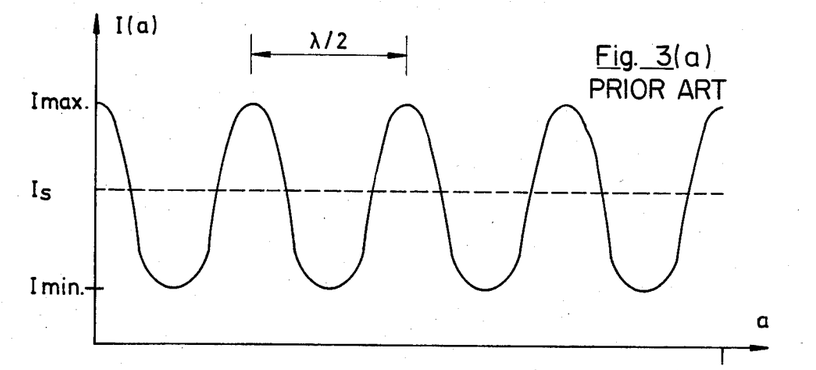
FIG. 3a is a graph of intensity changes as a function of distance showing the response obtainable with a system such as that shown in FIG. 1.

FIG. 2 shows an interferometer arrangement which differs from FIG. 1 in that the input and output light conductors 2 and 7 are on the same side of the reflectors 4, 5 forming the Fabry-Perot interferometer so that only a single lens 3 is needed while, in FIG. 1, an input lens 3 is required and also an output lens 6 is needed. In either case, light is delivered to the interferometer reflectors by fiber 2 and the intensity I(a) of the light which is delivered to output fiber 7 and is received by detector 8 is a periodic function of the distance "a" between the two reflectors 4, 5 of the interferometer, this relationship being graphically illustrated in a simplified manner in FIG. 3a for the interferometer of FIG. 1. For an interferometer according to FIG. 2, the characteristic of the light intensity I(a) has a similar appearance but is characterized by broader maxima and narrower minima. When using a monochromatic light source 1 with the wave length $\lambda$, the period of change of the intensity I(a) corresponds to a change in the distance "a" of one-half wave length. The light intensity I(a) at the same time varies between a maximal value $I_{max}$ and a minimal value $I_{min}$, and the electrical signal produced by detector 8 varies in proportion to this light intensity. In the subsequent electronic apparatus which process this signal information, a trigger circuit 9 is used which produces a step function or pulse signal in response to the crossing of a predetermined threshold by the input signal. Thus, when the threshold value is established at a mean light intensity value $I_s$ between $I_{max}$ and $I_{min}$, then a pulse signal is produced whenever the intensity value exceeds that threshold. If the distance changes by an amount which corresponds to several half wave lengths, the output of trigger circuit 9 is a corresponding number of impulses, i.e., $\Delta N = 2\Delta a/\lambda$ pulses. These signals can be counted by an electronic counter 10 and can be recorded in an evaluation unit 11 or can be otherwise evaluated by, for example, a microprocessor involved in a process control. The instrument shown in FIG. 1 thus represents a simple fiber optic incremental distance recorder for the eistance "a" between the two reflectors.

This arrangement, the principal of which is known, has a fundamental disadvantage in that it cannot distinguish between increasing changes of the distance "a" and decreasing changes of that distance. The reason for this lies in the symmetry of the maxima of the light intensity received by the detector 8 and of the detector output signals which are proportional thereto.

BRIEF SUMMARY OF THE INVENTION

Accordingly, it is an object of the present invention to provide a method and apparatus for measuring distances using interferometer principals in such a way that the apparatus also recognizes the direction of movement.

Additionally, it is an object to provide such a method and apparatus which employs a bidirectional counter allowing the count to be increased or decreased in proper correspondence with the instantaneous direction of movement, a function which had not been possible because the trigger signals fed to the counter in the prior art devices continued to shift the counter without consideration of the direction of the distance change.

Briefly described, the invention comprises a method for interferometrically measuring the length of relative linear movement between two locations and for simultaneously recognizing the direction of that movement comprising the steps of providing first and second reflectors at least the first being partly light-transmissive, the reflectors being arranged at the two locations so that a beam of light can pass through the first to the second, one of the reflectors having a reflection characteristic different from the other and asymmetrically related thereto such that the two reflectors form two Fabry-Perot interferometers which are merged into each other so as to concurrently respond to the same light beam in distinguishably different ways, passing monochromatic light through the first reflector to the second as the relative movement occurs such that the intensity of the emerging light changes asymmetrically, having main and secondary maxima at different levels and main and secondary minima at different levels, the order thereof being a function of the direction of movement, directing the emerging light to a detector to produce electrical signals varying in accordance with the intensity, establishing in a trigger circuit a plurality of threshold levels within the range of anticipated signal variations and comparing the varying signal with those levels to start and stop pulses as the signal crosses the thresholds, and combining the pulses to produce an output signal representative of direction and magnitude of movement.

In another aspect, the invention includes an apparatus for interfermetrically measuring the distance of relative linear movement between two locations and for simultaneously recognizing the direction of movement of one of the locations relative to the other comprising a monochromatic light source; a first partially light-transmissive reflector attached to said first location; a second reflector attached to said second location in parallel relationship with said first reflector, said reflectors being arranged so that light from said source passes through said first reflector toward the second; photodetector means responsive to light incident thereon to produce intensity signals proportional to the light intensity, said photodetector means being mounted to receive light emerging from said reflectors; trigger circuit means connected to receive the output of said photodetector means for producing pulse output signals when said intensity signals cross predetermined thresholds; at least one of said reflectors having first and second nonsymmetrical regions which reflect different portions of the same light beam at times which differ from each other by a fractional wavelength, thereby changing the phase of a portion of the light relative to the remainder thereof and forming, with the other of said reflectors, a pair of merged Fabry-Perot interferometer sets having distinguishable characteristics such that said photodetector means produces signals having a nonsymmetrical intensity characteristic with plural maxima of different height; and evaluating means responsive to the pulse positions from said trigger circuit means for indicating direction of movement and for counting pulses to indicate magnitude of movement.

BRIEF DESCRIPTION OF THE DRAWINGS

In order that the manner in which the foregoing and other objects are attained in accordance with the invention can be understood in detail, particularly advantageous embodiments of the invention will be described with reference to the accompanying drawings, which form a part of this specification, and wherein.

DETAILED DESCRIPTION OF PREFERRED EMBODIMENTS

As will be seen from the following discussion, one embodiment of the invention involves modifying one of the two reflectors of the Fabry-Perot interferometer so that the phase of the reflector in one region of the reflector surface is changed by a preferred amount of about $0.5\pi$, although the change as a practical matter can lie in the range of between about $0.1\pi$ to about $0.8\pi$, as compared with the phase of the reflection from the remaining area. It is alternatively possible to achieve this division of reflection characteristics by forming one of the reflectors such that its reflection phase for a certain degree of polarization deviates by approximately $0.5\pi$ from the reflection phase for the associated orthogonal polarization state.

Figure 3B:
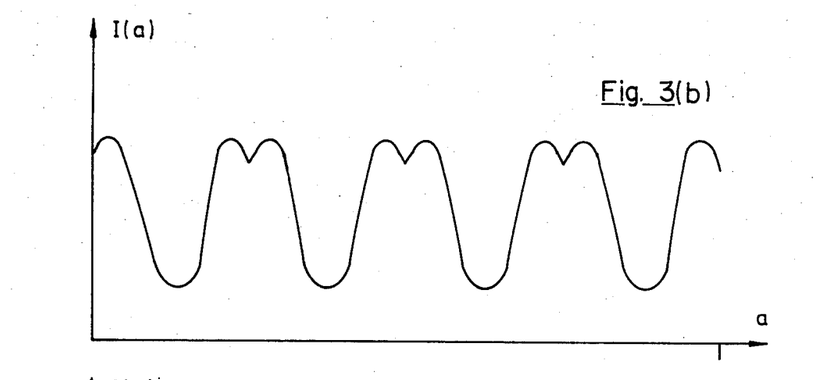
FIG. 3b is a graphical response curve of intensity with respect to distance in accordance with a double interferometer arrangement employing principals of the present invention.

In either case, the division or distribution has the effect that the interferometer has been modified so that it is, essentially, two interferometers merged or joined in an overlapping fashion into one another, the two interferometers being fed by the same beam of light from the same source and so that the light reflected or processed by the interferometer is incident upon the same photodetector. As will be recognized, if the relationship of the division of the two merged interferometers was to be selected at a ratio of 1:1, the intensity function received by the detector at a distance "a" would be determined as illustrated in FIG. 3b. In that curve of the signal which is representative the intensity I(a) has the two maxima which lie in close, side-by-side relationship and which represent the transmission maxima of the two individual interferometers, the phase of one maximum having been shifted from the other. However, with this 1:1 division, the double maxima still have a symmetry so that it is still not possible with this arrangement to distinguish between forward and backward movement.

Figure 3C:
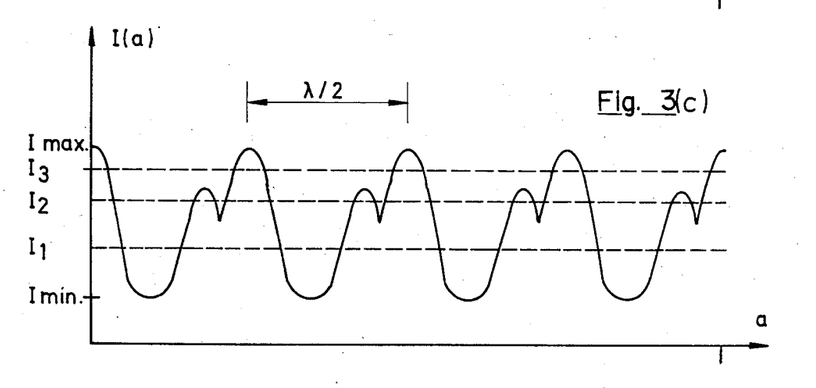
FIG. 3c is a representation similar to FIG. 3b showing an intensity characteristic in accordance with the invention from which direction can be derived.

However, such differentiation becomes immediately possible when a distribution ratio differing from 1:1 is used. FIG. 3c shows an intensity distribution using an interferometer in which the ratio between the two reflective portions or two characteristics is selected at about 1:0.75. In this arrangement, the double peaks exist but one maximum exhibits a considerably greater intensity than the other, and the two maxima are separated from each other by a clearly defined minimum, that minimum not being, however, as deep as the main minimum between pairs of maxima of a period which remains λ/2 as in the case of the simple structure according to FIG. 1.

As will be recognized, the asymmetric pattern of the intensity function illustrating movement from the distance "a" between the two reflectors provides a basis for recognizing the direction of movement.

Figure 4A:
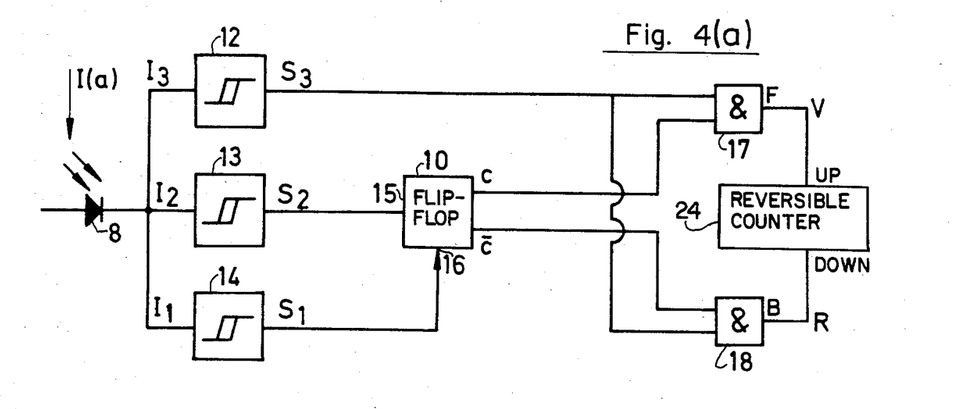
FIG. 4a is a schematic diagram, partly in block form, of an arrangement of electronic devices for evaluating the intensity distribution obtained with an apparatus in accordance with the invention.

FIG. 4a shows an arrangement of electronic components, which are conventional in themselves, but which are arranged in a particular manner to take advantage of the intensity distribution produced by the phase change described above, resulting in an electrical signal representative of the light intensity distribution, the electrical signal being supplied by photodetector 8.

Figure 4B:
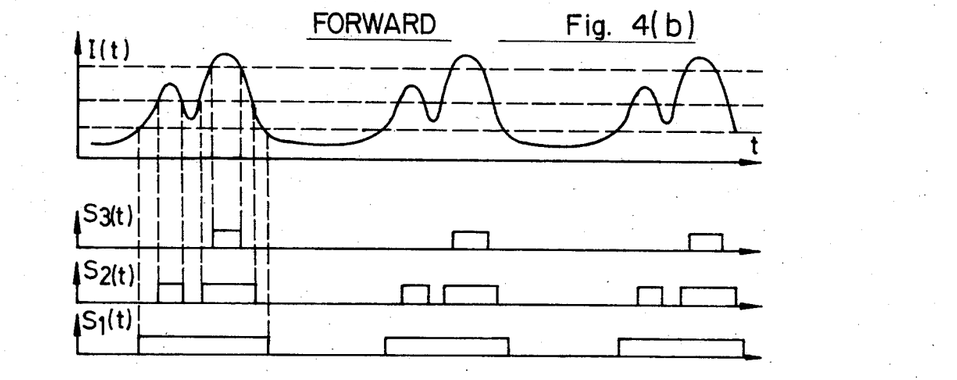
FIGS. 4b and 4c are combined graphical and wave form illustrations of intensity as a function of time and pulse distribution produced in accordance with the invention showing forward and backward movement, respectively.
Figure 4C:
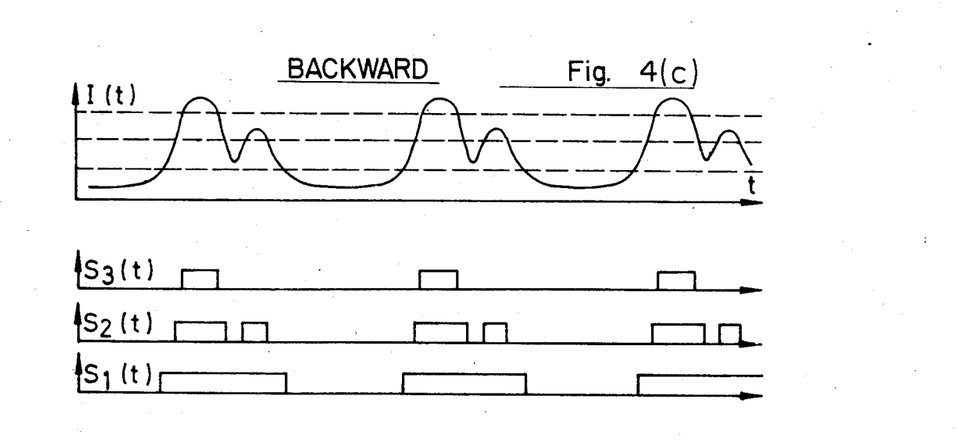

The signal produced by detector 8, which is proportional to reflection intensity I(a), is delivered concurrently to three electronic trigger circuits 12, 13 and 14 which are connected in parallel, these trigger circuits being provided with adjustable and predetermined threshold values selected so that they correspond to the intensity levels $I_1$, $I_2$ and $I_3$ which are shown in FIG. 3c. As will be recognized, the absolute values of these threshold levels are not significant, the significance being the relationship of the threshold levels to the intensity distribution signal. As is the case with such trigger circuits, the trigger output signals are logical "1" if the input signals exceed their specific thresholds. Depending upon the direction of movement, which will be defined such that "forward" refers to an increasing distance "a" and "backward" refers to a decreasing value of "a", the trigger output signals follow the patterns of the pulse signals illustrated in FIGS. 4b and 4c as $S_1$, $S_2$ and $S_3$. The difference between forward and backward movement in this arrangement resides in the fact that the output signals $S_3$ in the case of forward movement occurs temporally during the second impulse of the signal $S_2$ and, thus, also during a portion of signal $S_1$. During backward movement, signal $S_3$ temporally occurs during the first impulse of signal $S_2$ and thus, also, during the signal $S_1$.

This difference is detected in the circuitry shown in FIG. 4a. The $S_1$ and $S_2$ pulses are connected to a binary or flip-flop circuit 10, the input $S_1$ functioning as an "enable" and reset input and the $S_2$ pulses operating to switch the state of the circuit to alternate the outputs C and $\overline{C}$ between "1" states. Thus, the leading edge of an $S_1$ pulse resets and enables circuit 10, allowing it to respond to the leading edge of an $S_2$ pulse which flips the circuit so that the $\overline{C}$ output is "1" and the C output is "0". The C and $\overline{C}$ outputs are fed together with the $S_3$ pulses to two AND-gates 17 and 18. If the gates are supplied with a "1" from $\overline{C}$ and a "0" from C, along with $S_3$ pulses having a value "1", the situation is like that illustrated in FIG. 3C and gate 18 produces an output indicating backward motion. The reverse output from flip-flop 10 produces a forward output from gate 17. The outputs of these gates are marked with F and B indicating forward and backward. In accordance with the different coincidence of the $S_3$ pulses with either the second or first $S_2$ pulses explained above, the $S_3$ pulses reach the output F in FIG. 4a only if the movement is forward, and reaches the output B only if the movement is backward.

The outputs of gates 17 and 18 are connected to the "up" and "down" inputs, respectively, of a conventional reversible digital counter 24 which algebraically counts, in effect, the $S_3$ pulses in the appropriate direction and thus maintains a continuous count representing the position of the movable location referenced to the starting location. The output of the counter can be digitally displayed or printed out in any conventional fashion. This method of detecting the direction operates independently of the speed of the change of distance, i.e., it functions particularly well even when the movement is very slow. In order to avoid possible errors in the detection of direction arising from vibratory or trembling movement, it is advisable to provide the trigger circuits with a small hysteresis characteristic which is greater than the amplitude of an anticipated possible trembling movement.

There are also other possible circuits and analytic arrangements for the evaluation of the asymmetric intensity pattern for the purpose of recognizing and distinguishing between the forward-backward movement. In each case, however, it is necessary to begin with an intensity signal having a pattern which is characterized by the existence of two closely adjacent maxima having different peak heights, the maxima being separated by a clearly defined secondary minimum. The minimum is "secondary" in the sense that it can not be as low as the main minimum which exists between the sets of intensity peaks, i.e., the "dark" region.

The threshold value for triggering circuit 14 is preferably selected so that it is about midway between the primary and secondary minima discussed above. Similarly, the threshold value for trigger circuit 13 is preferably selected to be about midway between the secondary minimum and the secondary or lower maximum. The threshold value for circuit 12 is selected approximately midway between the levels of the two maxima. With this selection of the threshold values, the apparatus is least sensitive to slight fluctuations in the magnitude of the threshold values or of the total signal levels.

The practical physical embodiment of the two Fabry-Perot interferometers which are merged into each other in order to produce the described intensity characteristic can be accomplished in a variety of ways of which preferred embodiments are shown in FIGS. 5-8, in rather schematic form, by way of example. All of these embodiments are arranged to operate with an interferometer arranged in the manner of FIG. 2 rather than FIG. 1, with the input and output optical fibers on the same side of the apparatus, because of its greater simplicity. The pattern of intensity I(a) of the embodiment according to FIGS. 5-8 thus looks, quantitatively, somewhat different from the pattern shown in FIGS. 3b, 4b and 4c, as previously mentioned, in having the narrower minima and broader maxima, but closely resembles them qualitatively in the sense of having two closely adjacent maxima of different heights with a distinct minimum in between.

Figure 5:
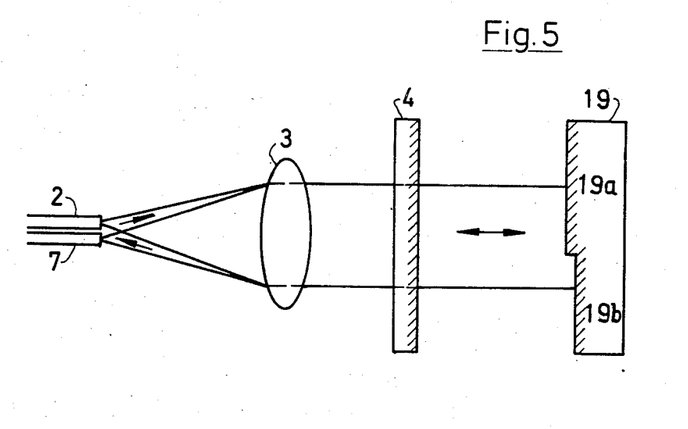
FIG. 5 is a simplified schematic diagram of an interferometer arrangement in accordance with the present invention.

The simplest embodiment is that according to FIG. 5. In that arrangement, the reflector 19 of the interferometer is provided with a step defining the separation between a thicker portion 19a and a thinner portion 19b. The thickness is, of course, of no consequence, the important difference being the distance between the reflective surfaces of reflectors 4 and 19 at any distance. Preferably, the difference in the distance between the reflective surface of reflector 4 to the reflective surface at portion 19a and the distance to reflective portion 19b is approximately λ/8. As a result of this difference, the light which is reflected from portion 19b experiences a delay of about λ/4 as compared with the light reflected at the upper portion 19a. Together with reflector 4, the lower portion 19b forms one interferometer while the upper portion forms the other interferometer. The previously described necessary uneven distribution of the beam of light to the two part-interferometers is achieved in the embodiment according to FIG. 5 by arranging the reflector so that the step in between portions 19a and 19b does not lie in the middle of the light beam but, rather, lies somewhat outside of the middle. In order to keep the distribution condition constant, it is necessary to maintain the relative position of the step with respect to the light beam by a particularly stable construction.

Figure 6:
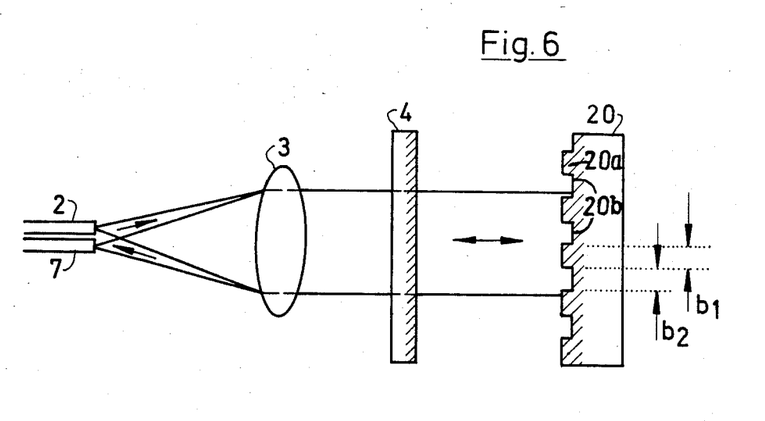
FIG. 6 is a schematic diagram of a further embodiment of an optical arrangement in accordance with the invention.

The disadvantage of having to have a particularly stable construction is avoided by the embodiment of FIG. 6 in which reflector 20 is provided withn a reflective surface having a plurality of steps forming a series of strips 20a which protrude from the surface interlaced with a series of recessed strips 20b, all of these strips being reflective surfaces which lie side-by-side. This reflector surface can thus be characterized as a strip grid. When a large number of strips, e.g., more than three, lies in the path of the light rays, then the reflection or transmission signal is substantially independent of the relative lateral position between the light beam and the strip grid.

The required uneven distribution of achieved in this embodiment by constructing the protruding and recessed portions such that the ratio $r=b_1/b_2$ is selected to be different from one, the values $b_1$ and $b_2$ being the widths of the protruding and recessed areas 20a and 20b, respectively. An optimal relationship which provides as clear as possible a separation of the various trigger threshold values lies at $r=1.5$ (or if the ratio is inverted, $1/r=1.5$). However, as a practical matter, the relationship can lie within the range of $r=$about 1.1 to about 10 (or $1/r=$about 1.1 to about 10).

Figure 7:
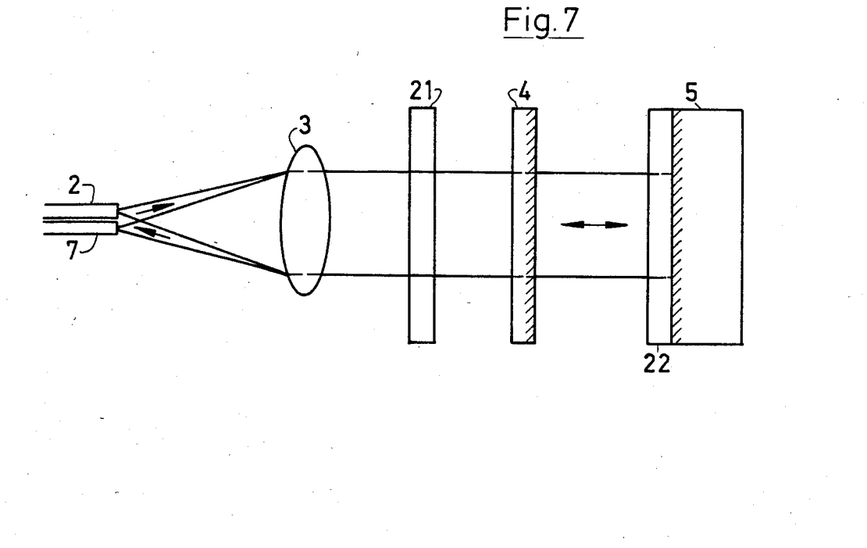
FIG. 7 is a simplified schematic diagram of a polarization optical arrangement in accordance with the present invention.
Figure 8:
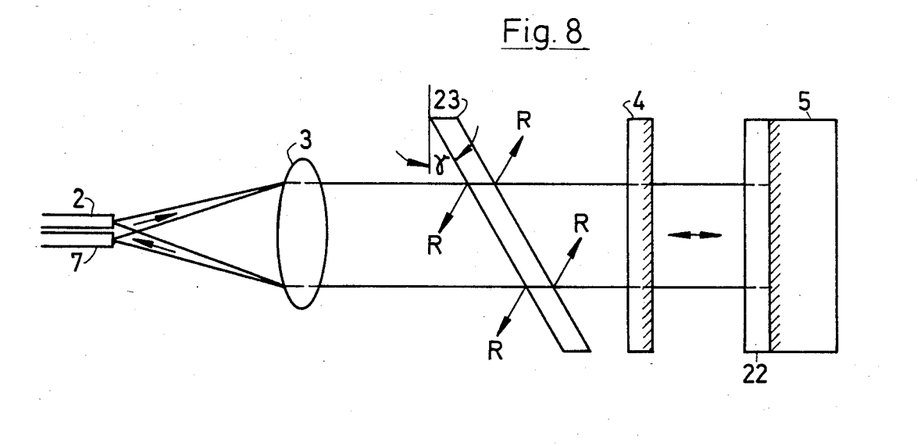
FIG. 8 is a schematic illustration of yet another embodiment of an optical arrangement in accordance with the invention.

FIGS. 7 and 8 show embodiments which use polarization techniques to achieve an arrangement in which the interferometer structure functions as two interferometers which are essentially merged, nested or interfitted with each other, these embodiments using an optical delay plate 22 disposed between the reflectors 4 and 5. The optical delay plate has a delay of λ/8 which corresponds to the previously mentioned necessary phase shift of π/2. The delay plate 22 can be oriented in such a way that its fast axis direction lies in the plane of the drawing of FIG. 7 while its slow axis direction is positioned perpendicular to the plane of the paper. As a result of the delay, the optical movement difference between the reflectors 4 and 5 is greater for polarized light having an electrical field which oscillates perpendicular to the plane of the drawing. In these arrangements, the two nested interferometers differ functionally from each other in having different polarization directions. The necessary unequal weighting is achieved in the embodiment of FIG. 7 by inserting a linear optical polarizer in the path of the rays outside of the interferometer and disposing the polarization angle of the polarizer at an angle relative to the axis directions of the delay plate 22 which is different from 45°. Optimally, the azimuth angle $\alpha=40°$ or 50°. However, as a practical matter, the azimuth angle can lie in the range of between about 10° and about 42°, or in the range of about 48° and about 80°. In order to avoid impeding the operation of the two part-interferometers by parasitic reflections at the surfaces of delay plate 22, the plate can be disposed slightly inclined relative to the reflector surfaces or it can be attached directed to the surface of one of the reflectors 4 or 5. Alternatively, this result can be achieved by applying the reflection layer to the back or reverse side of delay plate 22.

When the embodiment shown in FIG. 7 is operated with unpolarized light such as, for example, with the light from a light emitting diode, the double passage of the light through the polarizer results in considerable losses of light, typically of about 70%. This disadvantage is avoided by the apparatus shown in FIG. 8 which involves losses which are considerably less. In the embodiment of FIG. 8, the assumption is again made that the light emerging from light conductive fiber 2 is unpolarized and also that the delay, the azimuth and the arrangement of delay plate 22 between the reflectors is the same as described in connection with FIG. 7. However, instead of employing a polarizer 21, the apparatus of FIG. 8 uses a glass plate 23 which is disposed at an inclined angle γ placed in the path of rays outside of the interferometer. At the two surfaces of this glass plate, reflection losses occur in both the forward and backward movement of the light, these losses being schematically shown by the arrows R in FIG. 8. Because of the angle of inclination of plate 23, the magnitudes of these reflection losses depends on the polarization of the light. The losses are lowest for the light which is polarized in parallel with the plane of the drawing of FIG. 8 and is highest for light which is polarized perpendicular thereto. Thus, with regard to the light transmission from the input optical fiber 2 to the output optical fiber 7, the light which is polarized by plate 22 in parallel with the plane of the drawing is weighted more heavily than the light polarized perpendicular to the plane of the drawing. This guarantees that the height of the two maxima of the intensity signal I(a) will be different from each other. As a practical matter, the angle must lie in the range of about 10° to about 70°, although a value near the so-called Brewster angle is optimal, that angle being about 56° for glass.

It should be noted that the various modifications which have been suggested for one reflector in the interferometer structure described can, alternatively, be provided at the other reflector or in both reflectors at the same time so long as the selected arrangement is such that the necessary non-symmetrical characteristics of the intensity signal is maintained.

Further, it should be noted that in place of the phase difference of about π/2 the two part-interferometers, which value is regarded as being optimal, one can alternatively arrange for a phase difference in the neighborhood of 3π/2, 5π/2 and so forth, these latter phase differences agreeing in any case by a factor of 2π with the above mentioned phase difference π/2.

In order to have as clear as possible a separation between the two unequally high maxima of the doublemaximum signal, it is desirable to arrange the so-called "finesse" of the nested interferometers so that it lies in the range of about 5 to 10. The "finesse" is the relationship between the duration of the period to the duration of the impulse. If the structure is arranged with smaller values of the "finesse" factor, the separation between the maxima is insufficient, and if higher values are used, there are unnecessarily high losses of light and the tolerance for the parallel relationship between the reflective surfaces becomes unnecessarily tight.

While certain advantageous embodiments have been chosen to illustrate the invention, it will be understood by those skilled in the art that various changes and modifications can be made therein without departing from the scope of the invention as defined in the appended claims.

What is claimed is:

1. A method for interferometrically measuring the length of relative linear movement between two locations and for simultaneously recognizing the direction of that moving comprising the steps of providing first and second reflectors, at least the first being partly light-transmissive, the reflectors being arranged at the two locations so that a beam of light can pass through the first to the second, one of the reflectors having a reflection characteristic different from the other and asymmetrically related thereto such that the two reflectors form two Fabry-Perot interferometers which are merged into each other so as to concurrently respond to the same light beam in distinguishably different ways, passing monochromatic light through the first reflector to the second as the relative movement occurs such that the intensity of the emerging light changes asymmetrically, having main and secondary maxima at different levels and main and secondary minima at different levels, the order thereof being a function of the direction of movement, directing the emerging light to a detector to produce electrical signals varying in accordance with the intensity, establishing in a trigger circuit a plurality of threshold levels within the range of anticipated signal variations and comparing the varying signal with those levels to start and stop pulses as the signal crosses the thresholds, and combining the pulses to produce an output signal representative of direction and magnitude of movement.

2. A method according to claim 1 wherein three adjustable threshold levels are established, one in each of three trigger circuits, the step of combining the outputs further including supplying the output signals from two of the trigger circuits to a bistable circuit having two outputs which are the logical inverse of each other, supplying the bistable circuit outputs to two AND gates along with the output of the third trigger circuit, and supplying the outputs of the AND gates to the up and down count inputs, respectively, of a reversible counter.

3. An apparatus for interferometrically measuring the distance of relative linear movement between two locations and for simultaneously recognizing the direction of movement of one of the locations relative to the other comprising a monochromatic light source;

a first partially light-transmissive reflector attached to said first location;

a second reflector attached to said second location in parallel relationship with said first reflector, said reflectors being arranged so that light from said source passes through said first reflector toward the second;

photodetector means responsive to light incident thereon to produce intensity signals proportional to the light intensity, said photodetector means being mounted to receive light emerging from said reflectors;

trigger circuit means connected to receive the output of said photodetector means for producing pulse output signals when said intensity signals cross predetermined thresholds;

at least one of said reflectors having first and second nonsymmetrical regions which reflect different portions of the same light beam at times which differ from each other by a fractional wavelength, thereby changing the phase of a portion of the light relative to the remainder thereof and forming, with the other of said reflectors, a pair of merged Fabry-Perot interferometer sets having distinguishable characteristics such that said photodetector means produces signals having a nonsymmetrical intensity characteristic with plural maxima of different heights; and evaluating means responsive to the pulse positions from said trigger circuit means for indicating direction of movement and for counting pulses to indicate magnitude of movement.

4. An apparatus according to claim 3 wherein said at least one reflector comprises first and second reflective surface portions at different distances from the other reflector, the ratio of areas of said first and second portions being different from unity.

5. An apparatus according to claim 4 wherein the distance difference between said first and second surface portions is selected so that the phase difference between reflected light portions is between about $0.1\pi$ and about $0.8\pi$.

6. An apparatus according to claim 5 wherein said phase difference is about $0.5\pi$.

7. An apparatus according to claim 4 wherein said first and second surface portions comprise alternating recessed and protruding portions separated by steps, the height of said steps being about one eighth of the wavelength of the light from said source, and wherein the pattern of recessed and protruding portions is nonsymmetrically arranged relative to the center of the light beam.

8. An apparatus according to claim 7 wherein the reflective portions of all of said protruding portions lie in the same plane as each other and the reflective portions of said recessed portions lie in a common second plane.

9. An apparatus according to claim 8 wherein the widths of said protruding portions are different from the widths of said recessed portions.

10. An apparatus according to claim 9 wherein the ratio of the area of one of said portions to the area of the other of said portions is about 1.5.

11. An apparatus according to claim 10 wherein said trigger circuit means includes first, second and third trigger circuits each connected to receive the output of said photodetector means, each of said trigger circuits having a predetermined threshold level and being responsive to said intensity signals to produce pulses starting and ending when said intensity signals cross said threshold, the threshold levels being different from each other with the first trigger circuit having the highest in absolute value;

and wherein said evaluating means includes a pulse responsive circuit connected to receive the outputs of said second and third trigger circuits for producing binary outputs the states of which are representative of direction;

first and second gate circuit means each being connected to receive the output of said first trigger circuit and one of the binary outputs of said pulse responsive circuit and for producing a pulse train representative of direction and magnitude of motion; and a reversible counter having "up" and "down" count inputs connected respectively to the outputs of said first and second gate circuit means.

12. An apparatus according to claim 11 wherein said intensity signal includes a series of periodic waveforms each having a main minimum, a secondary minimum and two maxima of different heights separated by said secondary minimum and between said main minima;

and wherein said threshold values of said first, second and third threshold circuits are selected to be at approximately the levels of the mean values between said maxima, between the lower of said maxima and said secondary minimum, and between said minima, respectively.

13. An apparatus according to claim 7 wherein said trigger circuit means includes first, second and third trigger circuits each connected to receive the output of said photodetector means, each of said trigger circuits having a predetermined threshold level and being responsive to said intensity signals to produce pulses starting and ending when said intensity signals cross said threshold, the threshold levels being different from each other with the first trigger circuit having the highest in absolute value;

and wherein said evaluating means includes a pulse responsive circuit connected to receive the outputs of said second and third trigger circuits for producing binary outputs the states of which are representative of direction;

first and second gate circuit means each being connected to receive the output of said first trigger circuit and one of the binary outputs of said pulse responsive circuit and for producing a pulse train representative of direction and magnitude of motion; and a reversible counter having "up" and "down" count inputs connected respectively to the outputs of said first and second gate circuit means.

14. An apparatus according to claim 4 wherein said trigger circuit means includes first, second and third trigger circuits each connected to receive the output of said photodetector means, each of said trigger circuits having a predetermined threshold level and being responsive to said intensity signals to produce pulses starting and ending when said intensity signals cross said threshold, the threshold levels being different from each other with the first trigger circuit having the highest in absolute value;

and wherein said evaluating means includes a pulse responsive circuit connected to receive the outputs of said second and third trigger circuits for producing binary outputs the states of which are representative of direction;

first and second gate circuit means each being connected to receive the output of said first trigger circuit and one of the binary outputs of said pulse responsive circuit and for producing a pulse train representative of direction and magnitude of motion; and a reversible counter having "up" and "down" count inputs connected respectively to the outputs of said first and second gate circuit means.

15. An apparatus according to claim 14 wherein said intensity signal includes a series of periodic waveforms each having a main minimum, a secondary minimum and two maxima of different heights separated by said secondary minimum and between said main minima;

and wherein said threshold values of said first, second and third threshold circuits are selected to be at approximately the levels of the mean values between said maxima, between the lower of said maxima and said secondary minimum, and between said minima, respectively.

16. An apparatus for interferometrically measuring the magnitude of the amount of relative linear movement between two locations and for simultaneously recognizing the direction of movement of one of the locations relative to the other comprising a monochromatic light source;

a first partially light-transmissive reflector attached to said first location;

a second reflector attached to said second location in parallel relationship with said first reflector, said reflectors being arranged so that light from said source passes through said first reflector toward the second;

photodetector means responsive to light incident thereon to produce intensity signals proportional to the light intensity, said photodetector means being mounted to receive light emerging from said reflectors;

trigger circuit means connected to receive the output of said photodetector means for producing pulse output signals when said intensity signals cross predetermined thresholds;

optical means for time-modulating the intensity of light reflected from at least one of said reflectors as a function of relative movement therebetween so that said reflectors function as a pair of merged Fabry-Perot interferometer sets having distinguishable characteristics such that said photodetector means produces signals having a nonsymmetrically phase-shifted intensity characteristic with plural maxima of different heights; and evaluating means responsive to the pulse positions from said trigger circuit means for indicating direction of movement and for counting pulses to indicate magnitude of movement.

17. An apparatus according to claim 16 wherein said optical means includes an optical delay plate between said reflectors for introducing a polarization-sensitive delay of a fraction of a wavelength at the wavelength of said light source, and linear polarizing means oriented with its direction of polarization at an acute angle different from 45° relative to the polarization plane of said delay plate.

18. An apparatus according to claim 17 wherein the angle of said polarizing means is between one of about 10° to about 42° and about 48° to about 80°.

19. An apparatus according to claim 18 wherein the angle is at one of about 40° and about 50°.

20. An apparatus according to claim 16 wherein the phase shift of said intensity characteristics is about 0.5π.

21. An apparatus according to claim 16 wherein said optical means includes an optical delay plate between said reflectors for introducing a polarization-sensitive delay of a fraction of a wavelength at the wavelength of said light source, and an inclined glass plate mounted in the light path.

22. An apparatus according to claim 21 wherein said glass plate is inclined at an angle of between about 10° and about 70°.

23. An apparatus according to claim 22 wherein said glass plate is inclined at the Brewster angle.

* * * * *